United States Patent [19]
Davis et al.

[11] 3,727,497
[45] Apr. 17, 1973

[54] APPARATUS FOR SEPARATING AND SHEARING A CABLE STRAND

[75] Inventors: Charles H. Davis, Shrewsbury, N.J.; Lech Stanislaw Borczyk, Long Island City, N.Y. 10016

[73] Assignee: Anaconda Wire and Cable Company New York, N.Y.

[22] Filed: Apr. 14, 1971

[21] Appl. No.: 133,936

[52] U.S. Cl. ..........................83/167, 82/20, 83/490, 83/186, 83/923
[51] Int. Cl. .............................................B26d 7/00
[58] Field of Search.......................83/167, 440, 490, 83/508, 909, 907, 924, 580, 185, 186, 187, 923; 29/200; 146/101; 82/20, 82

[56] References Cited

UNITED STATES PATENTS

| | | | |
|---|---|---|---|
| 2,822,844 | 2/1958 | Busch | 146/101 |
| 3,491,637 | 1/1970 | Hasten et al. | 83/490 X |
| 3,459,080 | 8/1969 | Goettsch | 83/167 X |
| 3,612,412 | 10/1971 | Graveman | 83/923 X |
| 2,435,469 | 2/1948 | Roop | 83/186 |

*Primary Examiner*—Andrew R. Juhasz
*Assistant Examiner*—W. Donald Bray
*Attorney*—Victor F. Volk

[57] ABSTRACT

An apparatus for cutting an outer layer of helical wires from a cable core comprises an annular shear blade through which the core is advanced and planetary circular shear blades that cut the wires as they pass over the annular blade.

12 Claims, 2 Drawing Figures

APPARATUS FOR SEPARATING AND SHEARING A CABLE STRAND

BACKGROUND OF THE INVENTION

In the manufacture of wire cables such, for example, as electrical power cables it is customary to build up a diameter by helically winding a plurality of layers one layer over the other, until a sufficient metal area has been cabled to furnish the required electrical conduction. Armor wires are commonly applied, also, over sheathed cables such as submarine cables, core hole cables, and cables intended to be buried underground. Sometimes, after a considerable length of a core has been wrapped with a helical wire or, as is more usual, a layer comprising a plurality of helically applied wires, some defect may occur in one or more of the wires that necessitates either their removal or scrapping of the entire length of cable. Apparatus is known which will unwind the defective strands from the cable but such apparatus is complex and space consuming and has the particular objective in its operation that it must be precisely synchronized with the cable take-up to unwind the particular pitch of the layer being removed.

SUMMARY OF THE INVENTION

We have invented an apparatus that is capable of salvaging a cable core by removing a helical wire or a layer of helical wires from the outer surface and cutting or chopping these wires into short lengths that drop into a bin beneath the cutting area while the core is advanced unharmed. While our apparatus has its greatest applications for the removal of an entire layer comprising a plurality of wires from a core which is considered to comprise the portion of a cable under the layer to be removed, it can also be used to remove only one or several helical wires from the plurality of wires in a single layer in which case the work "core" is herein understood to include those wires that it is not desired to remove. Our apparatus comprises a fixedly mounted annular shear blade, means for guiding the core through the annular blade, and at least one circular shear blade mounted in cutting engagement with the annular blade. In one preferred embodiment of our apparatus we employ two diametrically mounted circular blades, and in all embodiments our apparatus comprises means for driving the circular blades in planetary motion around the annular blade. Advantageously our apparatus will comprise a hollow conical wedge that fits closely over the core and directs the wires to be removed around the annular blade, and means for driving the circular blades in rotation around their own axes. Preferably the direction of rotation of the planetary motion of the circular blades around the annular blade will correspond to the direction of lay of the helix of the wires being removed. That is, if, looking downstream the helix has a left hand lay, the planetary motion will be counterclockwise. To catch the cut lengths of wire our apparatus will advantageously comprise means comprising the area above and at the sides of the blades and a receptacle or bin under the comprising means.

In a particularly useful embodiment we have invented an apparatus for cutting helical wires from the core of a cable that is continuously advancing through an upstream to a downstream station, and upstream and downstream bushings supported on the frame. The upstream bushing fits closely around the cable and the downstream bushing fits closely around the cable and the downstream bushing fits closely around the core. In those cases where only a certain proportions of a plurality of strands are being removed from a layer as hereinabove mentioned, the cable and core will have the same diameters and the diameters of the two bushings will be the same. An annular shear blade is fixedly mounted between the bushings and coaxial to them a conical wedge, also coaxial to the bushings, is mounted upstream of the blade but downstream of the upstream bushing. This wedge fits closely over the core and, by its wedging action, continuously separates the wires from the core as the cable is advanced. This embodiment of our apparatus also comprises annular support means such as a toothed plate rotatably mounted coaxial to the annular blade and a plurality of circular shear blades mounted on the support means in cutting engagement with the annular blade. Planetary gears are fixed to the circular blades and an annular sun gear is mounted coaxial to the annular blade. Means are provided for driving the support means and thereby importing planetary motion to the circular blades and the planetary gears which mesh with the sun gear so as to rotate the circular blades around their respective axes. Means can be provided for adjusting the axial distance between the annular blade and the annular support means thereby adjusting the clearance between the annular blade and the circular blades; and means can also advantageously be provided for adjusting the distance between the upstream bushing and the wedge.

DETAILED DESCRIPTION OF A PREFERRED EMBODIMENT

Figure 1:
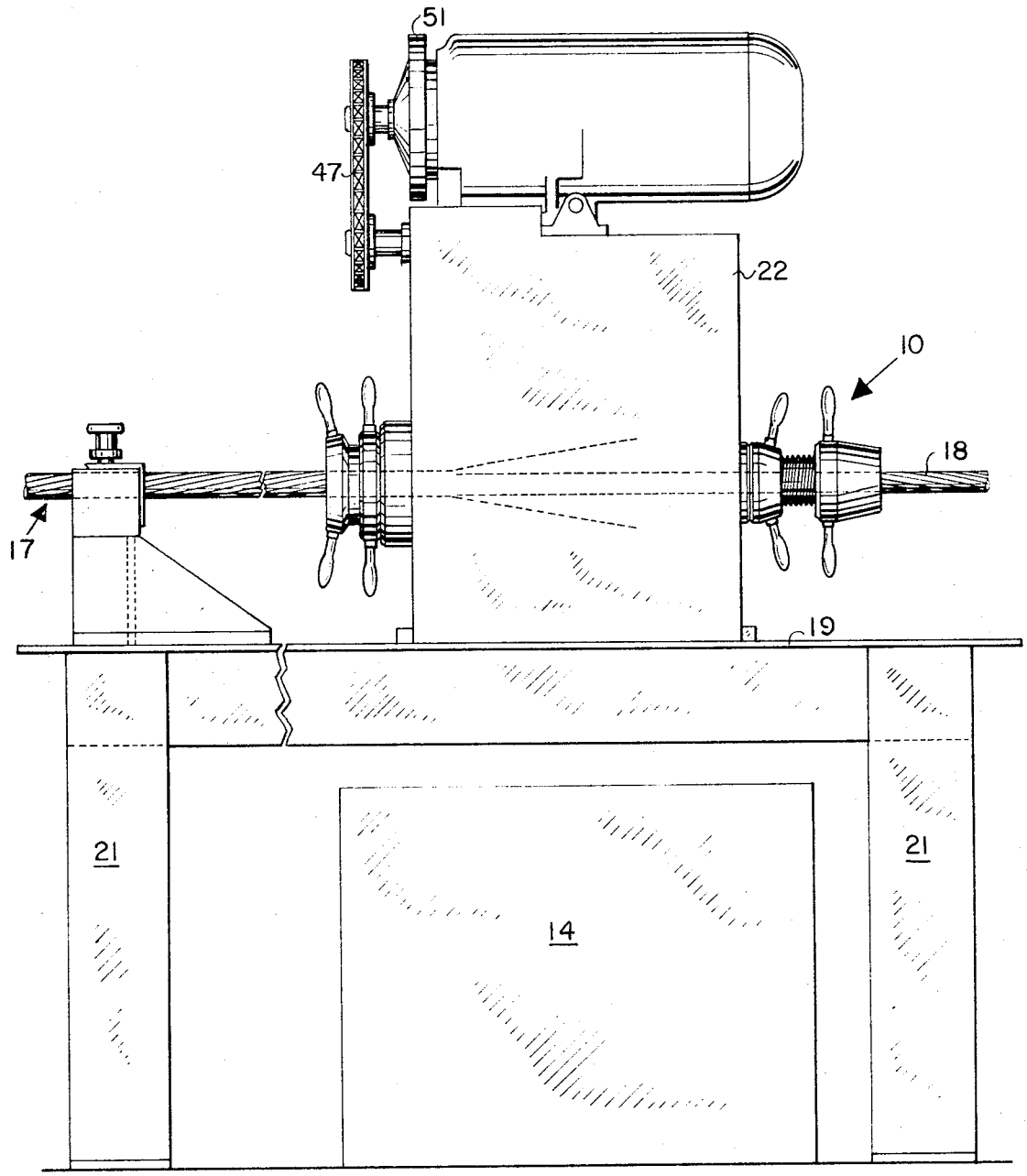
FIG. 1 shows a side view of the apparatus of our invention.
Figure 2:
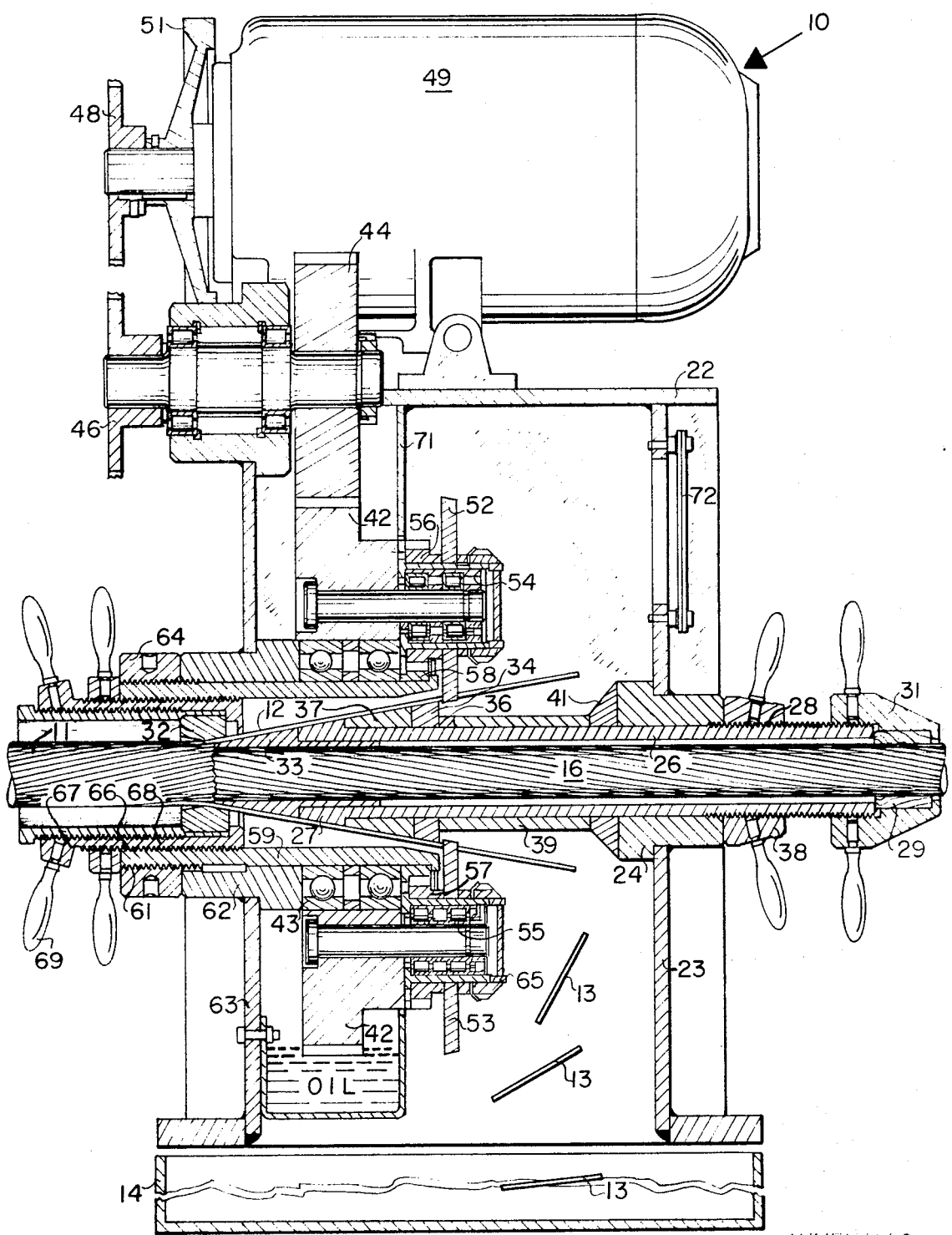
FIG. 2 shows a section through a portion of the apparatus of FIG. 1.

In the drawing our apparatus, designated by the numeral 10 is being used to salvage a cable 11 by removing from it a defective layer of wires 12 which are cut into short lengths 13 accumulated in a bin 14 for recovery. The cable 11 comprises a core 16 of wires similar to the wires 12 which core can be rewound with another layer of wires to produce a cable without defects. The cable 11 and core 16 are advancing to the right as seen in the FIGURES under the urging of a capstan, not shown, from a conventional supply reel, also not shown. In advancing, the cable passes through an upstream station designated for convenience by the numeral 17 and through a downstream station designated by the numeral 18 on its passage to the pulling capstan. The apparatus 10 is supported on a sturdy platform 19 with legs 21 separated to provide room for the bin 14. A frame 22 mounted on the platform 19 serves both as a housing to confine the chopped lengths of wire 13 and a support for the elements to be described. The frame 22 comprises a downstream wall 23 mounting a tube casing 24 for a tube 26 with a flange 27 at its upstream extremity and a threaded surface 28 at its downstream extremity. The tube 26 is large enough to accept the core 16 without scraping and a wooden bushing 29 supported at the downstream end of the apparatus 10 by a nut 31 that threads onto the surface 28. The present apparatus has particular utility for salvaging stranded aluminum conductors and it is important that the inner aluminum core remain free from scratches or burrs. This can be accomplished in the present apparatus where the wooden bushing 29 is replaceable and can be made accurately to fit any size core 16 to be salvaged. To keep the core from scraping any surfaces on its passage through the apparatus 10, it is supported, in addition to the bushing 29, by a coaxial upstream bushing 32 which fits the cable 11 over the wires 12. Where all the outer wires 12 are being removed damage from the bushing 32 is not critical and thin bushing need not be of wood. Immediately downstream of the bushing 32 the core is surrounded by a hollow conical wedge 33 pointed upstream. The wedge 33 has an inside diameter that fits closely over the core 16 and it separates the wires 12 from the core, directing them outwardly and around an annular shear blade 34 that is fixedly mounted, in the sense that it is not rotated, coaxial to the wedge and the bushings so that the core passes through it. Although it is not intended to rotate the blade 34 can be adjusted within a short distance laterally as follows. The blade 34 fits slidably over the tube 26 between a spacer disk 36 and a tapered sleeve 37. By means of a manually operated nut 38 acting against the casing 24 the blade 34 is urged against the disk 36 which is held spaced from the casing 24 by a sleeve 39 and a deflector 41. The axial position of the blade 34 can be varied by inserting disks 36 of different thickness. A large annular gear or toothed plate 42 mounted on a bearing 43 coaxial to the blade 34 is driven through a gear 44 sprocket 46 chain 47 and sprocket 48 by a motor 49. A hand-wheel 51 permits the gear 42 to be rotated to any desired position during set-up. Two circular shear blades 52, 53 are mounted on respective bearings 54, 55 secured 180° apart to the gear 42. The blades 52, 53 overlap the blade 34 so that they are in shearing engagement therewith and, upon rotation of the gear 42 shear off short lengths of the wires 12 that are projected over the edge of the blade 34 as the cable is advanced. We have found that the direction of rotation of the gear 42, and hence the planetary rotation of the blades 52, 53, should correspond to the direction of the lay of the helix of the wires 12, in other words the effect of the contact between the blades and the wires would be to tighten the helix. It has been stated that the clearance between the blades 52, 53 and 34 is determined by the thickness of the spacer 36. We prefer this distance to be from 0.01 to 0.02 inches for cutting aluminum power cable wires. We also prefer that the blades 52, 53 be driven in rotation around their own axes and for this purpose have respectively fixed planetary gears 56, 57 to these blades and have mounted a sun gear 58 on a fixedly mounted flanged cylinder 59 which has a threaded surface 61 at its upstream end. A flanged ring 62 is welded to an upstream plate 63 of the frame 22 and a nut 64 turning on the surface 61 against this ring 62 secures the cylinder 59 in our apparatus. The cylinder 59 is internally threaded on the surface 66 to receive a tube 67 having a matching thread 68 and hand grips 69. The bushing 32 is supported within the tube 67 and can thus have its position adjusted laterally by means of the grips 69. The cut lengths of wire 13 are comprised within the tops and sides of the area around the blades by the frame 22 and by a metal shield 71 which protects the gearing. A plastic window 72 offset from the wall of the frame 22 provides cooling ventilation.

OPERATION

When the outer layer of wires are required to be removed from a cable because, for example, they have been scuffed in handling, a bushing 29 and wedge 33 are selected to fit closely over the underlying core and a bushing 32 that fits over the outer strands. A sufficient length of the outer wires to be removed are cut off by hand to thread the apparatus and a tow line is connected to the core on the downstream end to tie on to a take-up reel and capstan. The take-up is started slowly so that the wedge 33 caused the ends of the wires to project over the blade 34 while the position of the blades 52, 53 are adjusted by means of the hand wheel 51 to permit the wires to pass between them. At this time the hand grips 69 can be turned to adjust the position of the bushing 32 to cause the wires 12 to flare out whence they are confined by the cylinder 59 in the desired conical configuration to be clipped off by the blades. At this time the wires may no longer maintain any contact with the wedge 33 whose principal function is to pry off the wires during start up. The apparatus 10 and core take-up can then be brought to full speed and bins 14 removed as they fill up. It is a noteworthy advantage of our apparatus that no particular synchronization is required between the take-up capstan and the motor 49, decreases in take-up speed merely resulting in a shortening of the scrape wire lengths. A gross overspeeding of the take-up must, however, be avoided since this will result in cut lengths 13 that do not fit in the confines of the frame. We have found that cut lengths 13 between 2½ and 6 inches are conveniently handled with the apparatus described.

The above description has been exemplary rather than definitive of our invention for which we desire an award of Letters Patent as defined in the following claims.

We claim:
1. Apparatus for cutting helical wires from the core of a continuously advancing cable comprising:
   A. a fixedly mounted annular shear blade,
   B. means guiding said core through said annular blade,
   C. at least one circular shear blade mounted in cutting engagement with said annular blade,
   D. means driving said circular blade in planetary motion around said annular blade, said wires advancing to project over the edge of said annular blade and being sheared off by engagement between said annular and said circular blade.

2. The apparatus of claim 1 comprising two of said circular blades diametrically mounted.

3. The apparatus of claim 1 comprising a hollow conical wedge closely fitting said core and separating said wires from said core, said wedge directing said wires around said annular blade.

4. The apparatus of claim 2 comprising a hollow conical wedge closely fitting said core and separating said wires from said core, said wedge directing said wires around said annular blade.

5. The apparatus of claim 1 comprising means driving said circular blade in rotation around its own axis.

6. The apparatus of claim 4 comprising means driving said circular blades in rotation around their own axes.

7. The apparatus of claim 1 wherein the direction of said planetary motion corresponds to the direction of the helix of said wires.

8. The apparatus of claim 2 wherein the direction of said planetary motion corresponds to the direction of the helix of said wires.

9. The apparatus of claim 1 comprising means confining the area above and at the sides of said blades and a receptacle under said confining means for catching the cut lengths of said wires.

10. An apparatus for cutting helical wires from the core of a cable continuously advancing through an upstream to a downstream station comprising:
A. a frame mounted between said stations,
B. upstream and downstream bushings supported on said frame,
   1. said upstream bushing closely fitting around said cable and
   2. said downstream bushing closely fitting around said core,
C. An annular shear blade fixedly mounted between and coaxial to said bushings,
D. a conical wedge mounted coaxial to said annular blade upstream of said blade and downstream of said upstream of said bushings, said wedge closely fitting over said core and separating said wires from said core,
E. Annular support means rotatably mounted coaxial to said blade,
F. a plurality of circular shear blades rotatably mounted on said support means in cutting engagement with said annular blade,
G. means driving said support means and thereby imparting planetary motion to said annular blades,
H. planetary gears fixed to said circular blades, and
I. an annular sun gear coaxial to said annular blade, said planetary gears meshing with said sun gears upon rotation of said support means and thereby rotating said circular blades about their respective axes.

11. The apparatus of claim 10 comprising means for adjusting the axial distance between said annular blade and said annular support means and thereby adjusting the clearance between said annular blade and said circular blades.

12. The apparatus of claim 10 comprising means for adjusting the distance between said upstream bushing and said wedge.

* * * * *